(12) United States Patent
Strothmann et al.

(10) Patent No.: US 9,800,933 B1
(45) Date of Patent: Oct. 24, 2017

(54) ELECTRONIC PROGRAM GUIDE FEATURES INCLUDING IP VIDEO WITH AVAILABLE HD IN THE CLEAR CHANNELS

(71) Applicant: Cox Communications, Inc., Atlanta, GA (US)

(72) Inventors: James Alan Strothmann, Johns Creek, GA (US); Yousef Wasef Nijim, Roswell, GA (US); Jay Paul Langa, Cumming, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 347 days.

(21) Appl. No.: 13/735,564

(22) Filed: Jan. 7, 2013

(51) Int. Cl.
  *H04N 21/462* (2011.01)
  *H04N 21/436* (2011.01)
  *H04N 5/445* (2011.01)

(52) U.S. Cl.
  CPC ........... *H04N 21/462* (2013.01); *H04N 5/445* (2013.01)

(58) Field of Classification Search
  CPC .... H04N 5/445; H04N 21/462; H04N 21/436; H04N 21/4821
  USPC ......................................................... 725/40
  See application file for complete search history.

(56) References Cited

U.S. PATENT DOCUMENTS

| | | | | |
|---|---|---|---|---|
| 8,661,472 B1 * | 2/2014 | Kardatzke | ............ | H04N 21/482 725/48 |
| 8,819,715 B2 * | 8/2014 | Wang | ................. | H04N 21/4263 725/14 |
| 8,935,726 B2 * | 1/2015 | Patel | ................. | H04N 5/44543 725/37 |
| 2007/0016932 A1 * | 1/2007 | Franken | ................. | H04N 5/445 725/51 |
| 2008/0141317 A1 * | 6/2008 | Radloff | ............. | H04N 5/44582 725/87 |
| 2008/0244671 A1 * | 10/2008 | Moon | ................ | H04N 21/4316 725/110 |
| 2009/0150959 A1 * | 6/2009 | Jerding | .................. | H04N 7/165 725/116 |
| 2010/0263010 A1 * | 10/2010 | Kim | ......................... | H04N 5/50 725/110 |
| 2011/0032979 A1 * | 2/2011 | Matsuo | .................. | H04N 19/63 375/240.01 |
| 2011/0107379 A1 * | 5/2011 | Lajoie | ................. | H04L 65/1016 725/87 |
| 2012/0044426 A1 * | 2/2012 | Jeffery | ................... | H04N 7/106 348/726 |
| 2012/0291071 A1 * | 11/2012 | Seo et al. | ........................ | 725/41 |
| 2013/0007830 A1 * | 1/2013 | Klappert | ................ | H04H 20/30 725/116 |

(Continued)

OTHER PUBLICATIONS

FCC 11-169 Date: Oct. 13, 2011 Author: Marlene H. Dortch Publisher: FCC.*

*Primary Examiner* — Nathan Flynn
*Assistant Examiner* — Tung T Trinh
(74) *Attorney, Agent, or Firm* — Merchant & Gould

(57) ABSTRACT

Data associated with content available for viewing is populated into a program guide display interface. The program guide display interface can display one or more QAM in the clear channels as well as IP-based channels. Mined data can be processed to create program guide information for populating a program guide view for display and use by an end-user.

20 Claims, 8 Drawing Sheets

250

| Channel | 7:00 | 7:30 | 8:00 | 8:30 |
|---|---|---|---|---|
| ABC (1002) HD QAM | National News | | Debate | |
| CBS (1005) HD QAM | College Football | | | |
| NBC (1006) HD QAM | News | Insight | Dinner with Steve | |
| FOX (1114) HD IP | Local News | 'Til Tuesday | NFL Draft | |
| ESPN (1605) HD IP | College Football | | Sports Center | Draft Coverage |

252
254
256
258
260

• • •

(56) References Cited

U.S. PATENT DOCUMENTS

| | | | |
|---|---|---|---|
| 2013/0198796 A1* | 8/2013 | Brooks | H04L 12/2898 725/129 |
| 2014/0068678 A1* | 3/2014 | Rodrigues | H04N 21/4532 725/48 |
| 2014/0130092 A1* | 5/2014 | Kunisetty | H04N 21/4821 725/40 |

* cited by examiner

| Channel | 7:00 | 7:30 | 8:00 | 8:30 |
|---|---|---|---|---|
| ABC (1002) HD/QAM | National News | | Debate | |
| CBS (1005) HD/QAM | College Football | | | |
| NBC (1006) HD/QAM | News | Insight | Dinner with Steve | |
| FOX (1114) HD/IP | Local News | 'Til Tuesday | NFL Draft | |
| ESPN (1605) HD/IP | College Football | | Sports Center | Draft Coverage |

Fig. 2b

ELECTRONIC PROGRAM GUIDE FEATURES INCLUDING IP VIDEO WITH AVAILABLE HD IN THE CLEAR CHANNELS

BACKGROUND

Generating program guides includes electronically mapping content information into readily identify programs of interest for end-users. As one common example, electronic program guides can be generated to identify times and programs associated with channels provided by a cable television network. However, generating a program guide in certain situation may be cost prohibitive. For example, certain content consumers have limited access based on resource and/or subscription limitations (e.g., analog, basic, no set-top box, no IP access, etc.). In such cases, a program guide may not be provided or may include limited or unrecognizable channel information, making it difficult for consumers to locate content.

The potential costs associated with enabling advanced video services to analog video service tiers may limit migration due to requiring installation and deployment of expensive consumer premise equipment (CPE) solutions. Without quick and reliable methods of informing consumers of available content, a service provider may find difficulty in maintaining service quality across a customer base. An opportunity to provide better and more efficient services may be lost by not taking advantage of broadcast QAM in the clear signals in addition to inefficient allocations of network bandwidth.

SUMMARY

To overcome the limitations described above, and to overcome other limitations that will become apparent upon reading and understanding the present specification.

Embodiments provide aspects of an electronic program guide (EPG) interface as part of providing an integrated view of available content from different sources. Embodiments encompass populating an EPG view with unencrypted or QAM in the clear signals along with IP-based signals, but the embodiments are not so limited. A method of an embodiment operates to use an EPG interface in part to populate an EPG view displayed at a user device, such as a smart television or other device/system coupled with a QAM tuner. A system of an embodiment includes an EPG generation component that provides aspects of an EPG view to be displayed with a user device/system running an EPG interface or other application. Computer storage of an embodiment includes instructions configured to operate and provide an EPG view that includes QAM in the clear signal information as well as IP signal and/or other information.

These and various other advantages and features of novelty are pointed out with particularity in the claims annexed hereto and form a part hereof. However, for a better understanding of the disclosed embodiments, the advantages, and the objects obtained, reference should be made to the drawings which form a further part hereof, and to accompanying descriptive matter, in which there are illustrated and described specific examples of the disclosed embodiments.

BRIEF DESCRIPTION OF THE DRAWINGS

Referring now to the drawings in which like reference numbers represent corresponding parts throughout:

FIGS. 2a-2b are block diagrams that depict components associated with providing and/or displaying electronic guide information using an EPG interface according to an embodiment;

DETAILED DESCRIPTION

Figure 1:
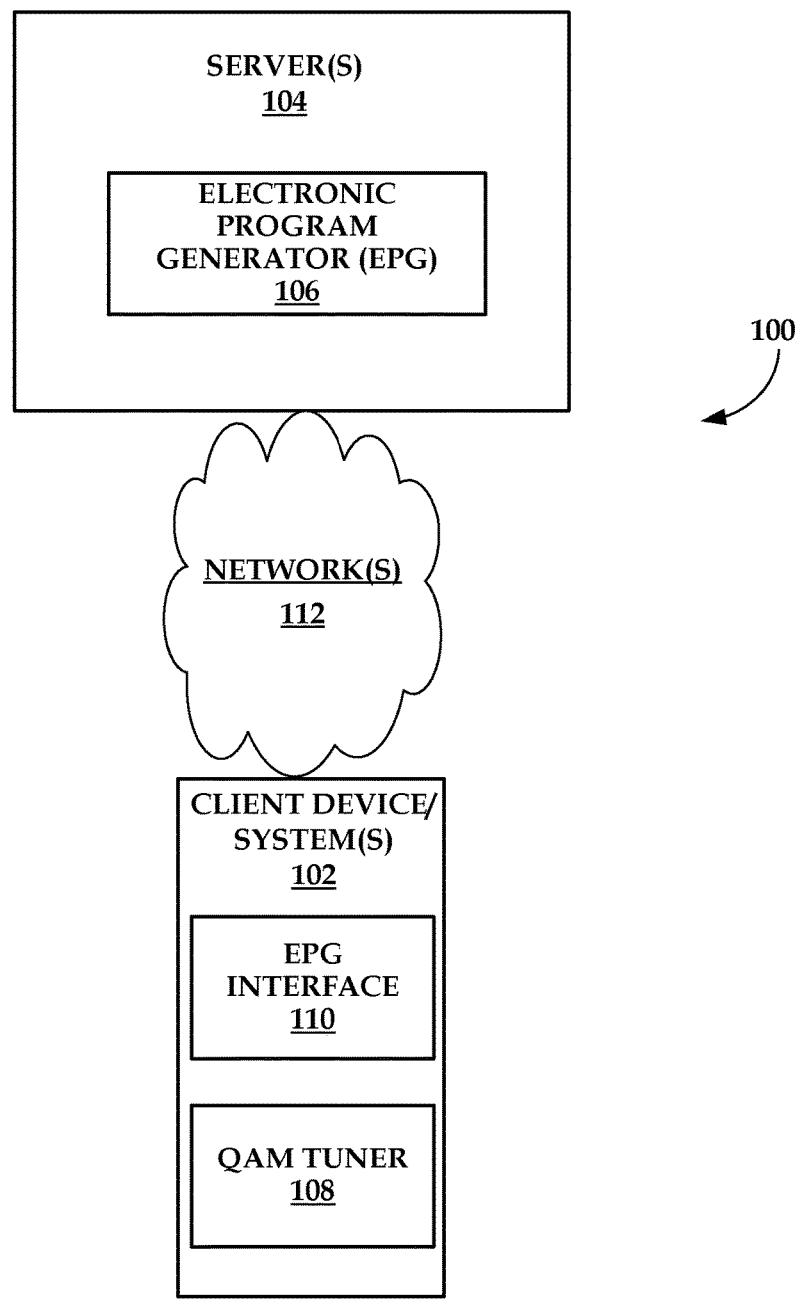
FIG. 1 is a simplified block diagram depicting aspects of a communication architecture according to an embodiment.

FIG. 1 is a simplified block diagram depicting aspects of an exemplary communication architecture 100 that includes a client computing device or system (client 102) in communication with a server computer or server 104 according to an embodiment. The server 104 of an embodiment includes a plurality of coupled computers and an EPG generator or component 106 configured in part to consolidate content from a number of sources as part of providing EPG features and capabilities to communicating clients 102.

Depending in part on a device/system type (e.g., smartphone, smart television, tablet computer, game console, laptop, desktop, digital video recorder (DVR) etc.), clients 102 of the exemplary communication architecture 100 can include corresponding functionalities that can be taken into account when providing (or not) EPG display information. For this example, client 102 includes an integrated or coupled QAM tuner 108 that can be used to receive unencrypted/unscrambled (referred sometimes as "in the clear") QAM signals.

The client 102 also includes an EPG interface 110 that can be used with the QAM tuner 108 to receive and/or display content provided over network(s) 112. The EPG interface 110 of an embodiment is configured to control and/or operate in conjunction with the QAM tuner 108 to display availability (and/or signal strength) of one or more QAM in the clear channels in conjunction with available IP channel information and/or other information such as IP On Demand "Free" and Transactional content and local HD Video Programs. The server 104, in part using the electronic program generator 106, is configured to provide aspects of an EPG view to each client 102 based in part on the corresponding functionalities, a subscription or service type, and/or some other criteria.

The client-server communication architecture 100 can provide include wireless and/or QAM tuner 108 communication components as used in the art today to deliver networked services including cable and Internet services. For example, a cable or other service provider can offer a downloadable EPG interface 110 that can be installed and used to display information including an EPG view populated with content available over IP channels and over QAM in the clear channels, including high definition television (HDTV) QAM in the clear channels, to subscribing customers.

The EPG interface 110 of one embodiment can be configured to provide a user option of selecting between a QAM in the clear channel via the coupled QAM tuner 108 rather than a corresponding IP-channel. The EPG interface 110 can also be configured with channel display selection information that can be used to control to display of available QAM in the clear channels. A service provider can use the EGP and QAM in the clear features to provide a selectable viewing channel option(s) and relatively rich user features while also promoting use of QAM in the clear signals in part to reduce bandwidth allocations over an IP-delivery network to channels that can be delivered with the same or better quality using RF delivery.

As described above, the exemplary communication environment 100 provides an architecture of networking components enabled to deliver analog and/or digital content for displaying using the EPG interface 110 and an EPG view. One example enables the EPG interface 110 to be installed on a smart TV or other QAM-enabled device/system (e.g., an IP-enabled set-top box or other component configured with QAM reception functionality) and used to control use of QAM in the clear signals. The EPG interface 110 can be configured to operate in conjunction with the QAM tuner 108 to enable efficient navigation to QAM in the clear video content over RF rather than using an IP communication path.

Providers can utilize the functionality provided by the EPG interface 110 to enable a cost effective digital conversion from analog video subscribers to digital video subscribers without requiring the use of set-top boxes. However embodiments encompass the use of set-top boxes in conjunction with QAM tuners to generate an EPG view for a subscriber. Many types of available consumer equipment are configured to provide services such as closed captioning, parental controls, SAP, etc. The EPG interface 110 can be configured to navigate through available channels for a certain analog tier to allow customers to tune to and remember channels more easily as accustomed to using their cable or satellite provider services.

The EPG interface 110 of an embodiment is configured to bridge an IPTV video application and direct the QAM tuner 108 to the location of local QAM in the clear HD video services. Such control alleviates the difficulty in finding and navigating to a spectrum location due in part to limited metadata. The EPG interface 110 of one embodiment can be configured to assume full control of a QAM or other tuner and communicate information such as program ID, channel ID or source ID back to server 104 or other headend component in order to send the correct QAM channel over the RF communication path using the video spectrum rather than using the IP spectrum. The server 104 can store the received information to computer storage. Using QAM in the clear signals rather than IP delivered video can alleviate some of the bandwidth constraints since these HD channels may quickly consume the available bandwidth over IP as there could be more receiving components in the household and the premise.

The EPG interface 110 can enable basic tier video subscribers to receive advanced digital IP, On Demand, and/or QAM in the clear services. The EPG interface 110 also enables analog customers to control other auxiliary services such as closed captioning, parental controls, etc., enabling integration of the various services through a service provider as part of offering services delivered over RF rather than, or in addition to, IP. While one client and server are shown in FIG. 1, it will be appreciated that a complex communication network includes a number of associated network-enabled components, including hardware and software components such as a plurality of networked servers, routers, switches, modems, and/or other client devices/systems.

As an example of some of the aforementioned capabilities, consider a scenario when a user purchases a smart HDTV. If available, the user can use the menu control to navigate to the EPG interface 110 within an application or other store. The EPG interface 110 can then be installed and loaded on the HDTV platform. The consumer can register an HDTV or other component and configure their account and login parameters. The EPG interface 110 can then be launched from the HDTV menu, wherein the EPG interface 110 is configured to operate in conjunction with an associated QAM tuner. The EPG interface 110 of one embodiment includes software commands configured to bridge an IP video application of the HDTV to direct the HDTV tuner to tune to a requested HDTV QAM in the clear channel rather than an IP counterpart. The EPG interface 110 can be configured to selectively display QAM tuning information and relevant CDN URL information as part of the service.

Once logged in, an EPG view can be presented, automatically or upon user selection, to provide the user(s) with the relevant channel lineup corresponding to a video service offering and/or login information. The EPG interface 110 can be configured to access to Digital IP Linear streaming video (e.g., different ABR profiles up to HD resolution) of traditional cable TV channels, IP On Demand "Free" and Transactional content and local HD Video Program to populate aspects of the EPG view. When the user navigates and selects a local channel to view, the EPG interface 110 of one embodiment allows an IP Video application to direct the QAM in the clear tuners of the HDTV to select the video program for easy navigation to the QAM in the clear HD Video service as part of an integrated application environment. The EPG interface 110 enables conservation of limited amounts of DOCSIS bandwidth since local channels can be provided with QAM in the clear signals rather than IP video signals.

As described above, the EPG interface 110 of an embodiment can be configured to bridge an IP video application to direct the QAM tuner 108 to tune to a requested HDTV QAM in the clear channel. As an implementation example, the EPG interface 110 can be configured with application code, such as advanced HTML and java script extensions to control QAM tuner parameters associated with the displaying device/system. HTML code can be used to differentiate content using an associated java script command instead of a URL and CDN to perform a channel change. User preferences can be stored in computer storage such as memory for example to configure the use of available HDTV in the clear signals rather than IPTV signals. Java script parameters can be used to interface with an associated QAM tuner to translate local frequencies of HDTV signals into recognizable local channel numbers (e.g., 22.1 to 1004, 17.5 to 1002 etc.) for display in the user EPG view. QAM channel frequencies are known and can be identified according to a user location and/or associated RF infrastructure.

As described above, the EPG interface 110 can be configured to present the user with an option to use a local HDTV QAM signal and/or provide an indication of signal strength or quality so that a user can make an informed decision as to selecting QAM in the clear channels. The EPG interface 110 of an embodiment can be configured with command parameters to communicate necessary tuning information which can include QAM channel, carrier, frequency, and/or appropriate program identifier (PID) information. The user can use the EPG interface 110 to selectively control tuning to a local broadcast affiliate using either a CDN information URL or a QAM in the clear channel received using an associated QAM tuner.

Accordingly, the functionality provided by the EPG interface 110 of an embodiment allows use of a java script command to communicate directly with QAM tuner 108 or an operating system or other component that interfaces with the QAM tuner 108 to issue a tuning command and substitute a QAM in the clear signal over the RF network for an IP delivered video signal. In many situations, an HDTV in the clear channel may provide better video quality to the consumer while acting as a potential bandwidth saver for the IP delivery network. Thus, the user can be given an option or control of viewing content over the IP delivery network or the RF network.

Figure 2A:
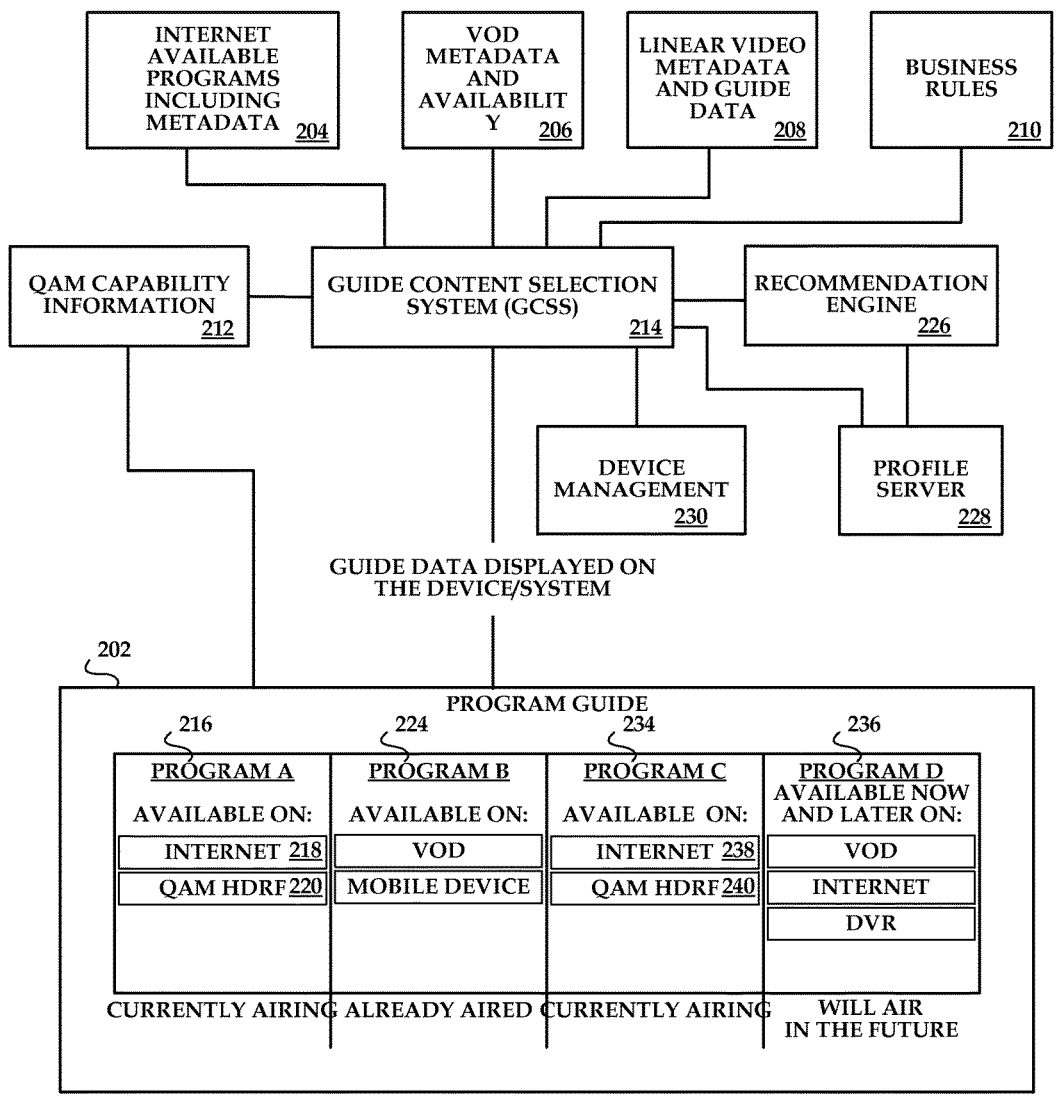

FIGS. 2a-2b are block diagrams that depict components associated with providing and/or displaying electronic guide information using an EPG interface according to an embodiment. As shown in FIG. 2a, the exemplary program guide display interface (PGDI) or EPG view 202 provides availability information associated with video content from a plurality of sources 204, 206, 208, 210, and 212, but is not so limited. For example, the plurality of sources 204, 206, 208, 210, and 212 may include programming data, metadata, availability information, signal strength and/or quality, etc. associated with available content, including content delivered over RF and IP networks. While a simplified block diagram is shown, it will be appreciated that RF and IP networks include sophisticated hardware and software components.

As described above, it can be beneficial to use unencrypted QAM signals to deliver certain broadcast content rather than using the IP delivery network, such as when providing HD displays. As such, the QAM capability information 212 can be used to determine if a QAM in the clear channel can be substituted for an IPTV channel. The QAM capability information 212 can be used locally by an associated EPG interface or provided to the guide content selection system (GCSS) 214 for use in populating the PGDI 202.

As shown in FIG. 2a, a first program 216 is currently airing and available optionally from internet content source 204 (INTERNET channel 218) or from a QAM in clear channel 220, wherein the associated availability information can be presented in the PGDI 202. A selectable link can be associated with INTERNET channel 218 and QAM in the clear channel 220 such that a user can choose which delivery network to use to deliver the content. In one embodiment, the QAM in the clear channel 220 can also display signal quality information to enable a user to select the best option. In an alternative embodiment, based in part on the QAM signal quality, the QAM channel 220 can be automatically selected and displayed on screen without user action. The user can select which delivery network to watch the program from without having to perform step-by-step navigation operations to a content source. Continuing this example, a second program 224 is a VOD asset from content source 206 and a link can be provided in the PGDI 202 so the user may be directed to the VOD asset. Linear video programs from content source 208 can also be provided via a set-top box, DVR, or some other device/system.

Available content may be automatically filtered based on customer preferences, viewing conditions, and/or based on business rules 220. For example, a business rule could be programmed to automatically select a QAM in the clear HD channel over an HD IPTV channel when a signal quality factor exceeds or equals some defined threshold. The recommendation engine 226 can also be configured to generate predictions regarding program selection. Profile server 228 can be used to obtain a user profile based at least in part on the user and device/system information which can include QAM in the clear HDTV preferences.

The QAM capability information 212 can also contain delivery preferences. For example, if a user typically watches local HDTV channels delivered via an IP delivery network, the QAM capability information 212 can reflect that it may be more efficient and provide a better user viewing experience to deliver the content over a QAM in the clear channel. A user profile may reflect that a user prefers to access content using a mobile computing device, such as a tablet or smart phone including using a QAM tuner adapter, rather than being constrained by a set top box, and include information indicating such behavior or preference(s) to provide program guide data. The profile server 228 can also include other information and/or preferences such as parental control settings, SAP controls, etc.

A device management server 230 can be configured to provide information regarding devices/systems associated with a user account. The recommendation engine 226 can communicate with the profile server 228 to apply user profile parameters to generated program selection predictions. Predictions may be based on a determination of on what device/system the user typically watches content (e.g., a smart television to watch local channels, a tablet to watch VOD channels, where the user is located, etc.). The recommendation engine 226 may also identify the device/system currently in use and provide an appropriate display of available content in the PGDI 202.

Once the information is collected by the GCSS 214, business rules 210 can be applied to any recommendations. Business rules 210 can be used to control a number of user operations such as, for example, a priority for VOD over the Internet, a priority to linear programming on a user DVR, a priority based on QAM in the clear availability and/or signal quality, etc. Additional guide data can be displayed with the PGDI 202 while the customer is navigating or filtered out based on the customer preferences or some other criteria. According to this example, a customer can navigate already aired programming to display missed programs, including links and/or information about the availability of the programs 216, 224, 234, and 236.

With continuing reference to FIG. 2a, a third program 234 is currently airing and available optionally from internet content source 204 (INTERNET channel 238) or from a QAM in clear channel 240, wherein the associated availability information can be can be presented in the PGDI 202. A selectable link can be associated with INTERNET channel 238 and QAM in the clear channel 240 such that a user can choose which delivery network to use to deliver the content. Other program availability is based on the customer subscription to certain tiers and networks. Available programs may be dynamically removed or added as content becomes unavailable or available. While a certain number and configuration of components are shown and discussed with respect to FIG. 2a, it will be appreciated that other numbers and configurations of components are possible.

FIG. 2b depicts another example of an exemplary PGDI or EPG view 250 that includes display and/or interactive features that enable users to navigate, select, and/or control use of QAM in the clear channels, including SD and HD, in conjunction with additional services, such as parental controls, security, etc. For this example, the PGDI 250 is displaying a number of available channels that a user may either select to view or obtain additional information about a particular program. As shown, the PGDI 250 of an embodiment includes a number of additional integrated controls 252, 254, 256, 258, and 260 that provide informative as well as selectable channel information.

Integrated control 252 of the PGDI 250 is currently set to an HD QAM setting to receive the ABC affiliate using a corresponding HD QAM in the clear broadcast signal. For this example, an associated QAM tuner is used to receive the HD QAM in the clear broadcast signal. If more than one delivery network is available, the user can select integrated control 252 to control which delivery network to use to view the ABC affiliate. The PGDI 250 of one embodiment can be configured to not present an integrated control for a particular channel when only one delivery network or option is available.

Integrated control 254 of the PGDI 250 is currently set to an HD QAM setting to receive the CBS affiliate using a corresponding HD QAM in the clear broadcast signal. Integrated control 256 of the PGDI 250 is currently set to an HD QAM setting to receive the NBC affiliate using a corresponding HD QAM in the clear broadcast signal. Integrated control 258 of the PGDI 250 is currently set to an HD IP setting to receive FOX programming delivered over an IP network. Integrated control 260 of the PGDI 250 is currently set to an HD IP setting to receive ESPN programming delivered over the IP network. As described above, the PGDI 250 can be configured to automatically select the best channel signal and/or enable user selections and/or preferences. It will be appreciated that, depending in part on a subscription or device/system type that more or fewer channels may be presented in the EPG view, including HD QAM channel availability or acceptable signal quality. As described above, signal reception capabilities can be determined and a user profile can be built to reflect any QAM in the clear or other preferences.

Figure 3:
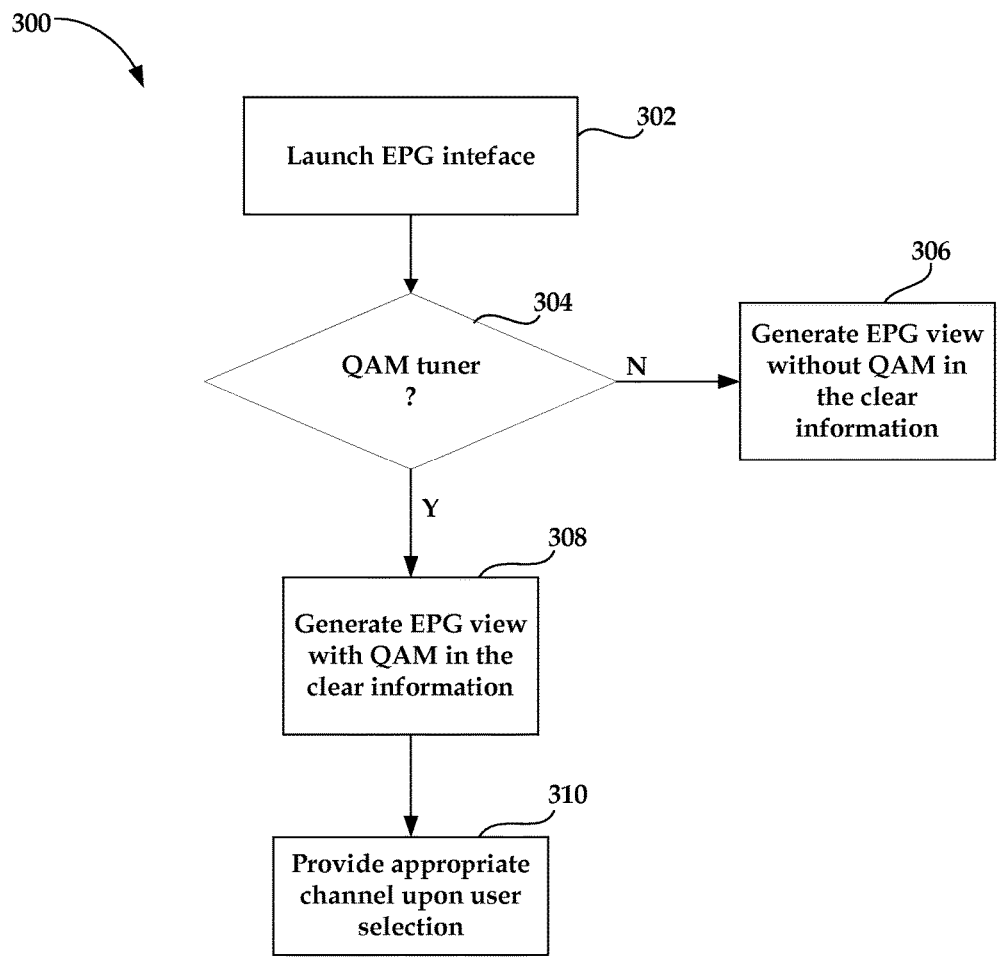
FIG. 3 is a flow diagram illustrating an exemplary process of providing features of an EPG interface used to provide an EPG view according to an embodiment.

FIG. 3 is a flow diagram illustrating an exemplary process 300 of features of an electronic program guide (EPG) interface used in part to provide an EPG view according to an embodiment. If available, the process 300 can use one or more QAM in the clear channels to provide aspects of the EPG view that can include program data received from IP and RF delivery networks. Depending in part on a particular network configuration and/or subscription type, the process 300 can utilize multiple signal inputs in part to generate an electronic program guide for each user. For example, smart televisions are now equipped with processing, memory, and QAM reception capabilities that include wired and/or wireless couplings, to utilize multiple input types to deliver viewing options for consumers. An exemplary processing device/system may be configured to use signals provided by coupled antenna(s), cable(s), and/or wireless components to receive signal inputs for use in populating the EPG view.

At 302, the process 300 begins upon launching an EPG interface associated with viewing program content. For example, the process 300 can launch an EPG interface when a user wishes to peruse available programming content according to a particular subscription type and/or after installing the EPG interface. The EPG interface of an embodiment may be automatically provided or selectively downloaded by subscribing users.

At 304, the process 300 determines if a receiving device/system includes a QAM tuner. For example, upon registering a device/system, and viewing preferences, model information, network capabilities, and/or location(s) may be used to determine signal reception and/or coupling capabilities of each registering device/system.

At 306, the process 300 generates the EPG view without using QAM in the clear signal information since a QAM tuner is not available or operating. For example, the process 300 at 306 operates to generate the EPG view with a relevant channel lineup associated with a particular service and/or login information, such as accessible Digital IP Linear streaming video of traditional cable TV channels, IP On Demand "Free" and Transactional content, local HD programming, etc.

On the other hand, if a QAM tuner is available and operational, the process 300 proceeds to 308 and generates the EPG view for the relevant lineup which may include available QAM in the clear signal information. For example, an EPG interface can use the QAM in the clear signal information to automatically direct the QAM tuner to an appropriate QAM in the clear channel when a user opts to view a local HD broadcast.

At 310, the process 300 operates to provide an appropriate channel according to a user viewing selection input. For example, the user can quickly locate a local HD affiliate to watch a college football game using the HD QAM in the clear signal rather than an IP signal. As described above, the EPG view can be populated with information so that a user can optionally select to use QAM in the clear signals for viewing. Alternatively, QAM in the clear signals can be automatically used for HD or other viewing purposes.

Correspondingly, the process 300 enables presentation and use of an EPG view that can utilize one or more available HD QAM in the clear signals rather than corresponding HD IP signals to conserve limited amounts of DOCSIS bandwidth. The EPG view can be configured using profile information, view preferences, EPG configuration parameters, etc. The EPG view also provides a means for enabling a user to efficiently navigate to a HD QAM in the clear signal by providing recognizable information that guides the user quickly to a desired program. While a number and order of operations are described, it will be appreciated that the embodiments encompass other implementations.

Figure 4:
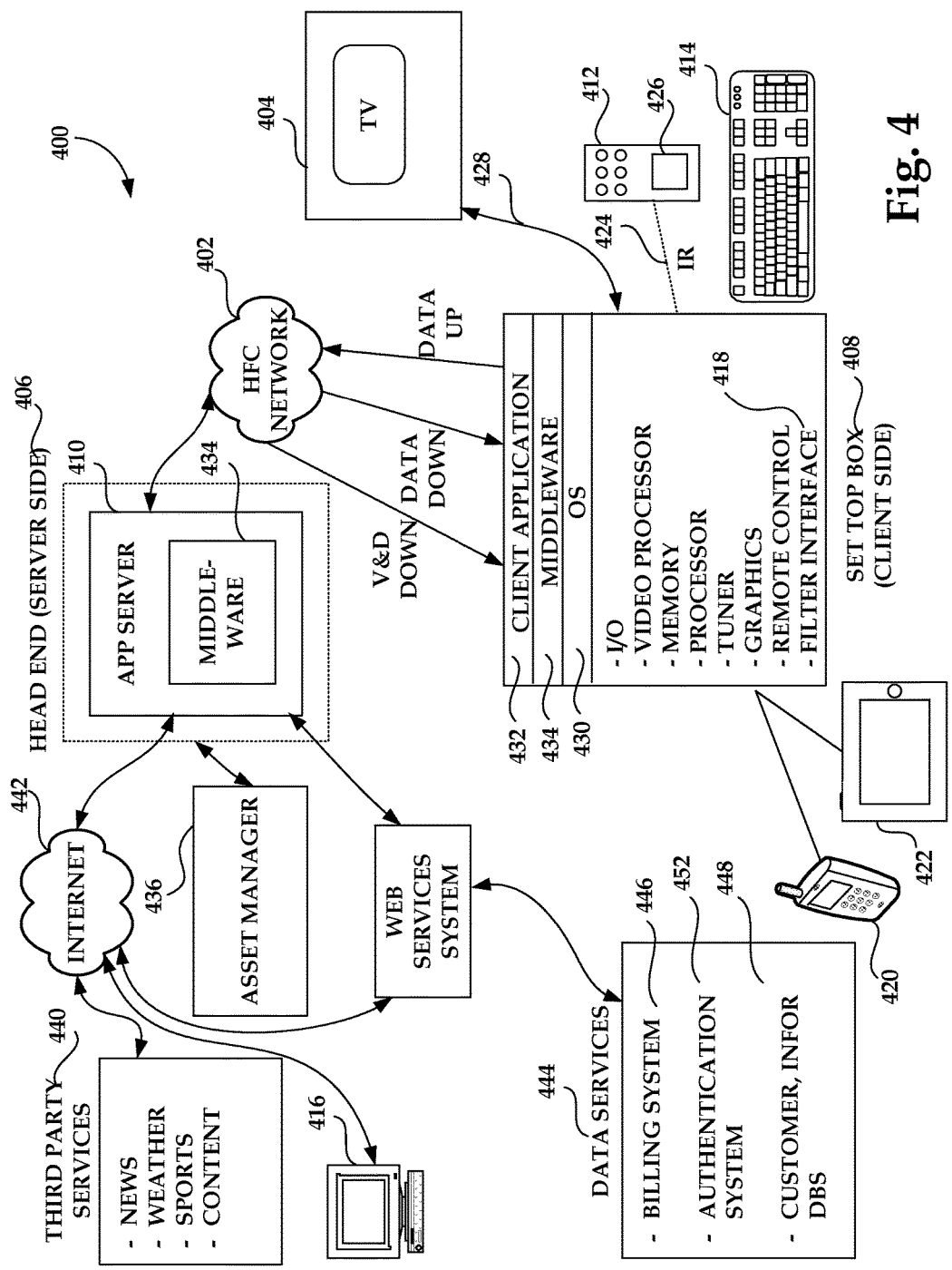
FIG. 4 depicts components of an exemplary communication architecture providing an operating environment according to an embodiment.

FIG. 4 depicts components of an exemplary communication architecture 400 providing an operating environment according to an embodiment. The architecture 400 includes components that provide cable television and other services (hereafter referred to as "CATV") including IP and RF reception capabilities. As described below, components of the architecture 400 can be configured to provide EPG features enabling users to efficiently navigate QAM in the clear and IP channels. For example, a service subscriber can use a device/system having or coupled to a QAM tuner and an EPG application or interface to easily navigate to and view local HD in the clear channels for each channel lineup.

As shown in FIG. 4, digital and analog video programming, information content, and interactive television services are provided via a hybrid fiber coax (HFC) network 402 including optical fiber and coaxial cable components to a television 404, such as a smart television for example. Typically, optical fiber runs from the cable head end 406 to neighborhoods of subscribers. Coaxial cable runs from the optical fiber feeders to each customer or subscriber. The functionality of the HFC network 402 allows for efficient bidirectional data flow between a client-side components, such as set-top box (STB) 408, and an application server 410.

The exemplary architecture 400 can be configured as a distributed client-server computing architecture for providing video and data flow across the HFC network 402 from server-side services providers (e.g., cable television/services providers) via head end 406 and set-top box (STB) 408 or other component functionally connected to a customer receiving device, such as a smart television set 404 or other device/system for example. Modern CATV systems provide a variety of services across the HFC network 402 including digital and analog video programming, telephone services, high speed Internet access, video-on-demand, live video streaming, and/or information services as known to those skilled in the art.

On the client side of the architecture 400, digital and analog video programming and digital and analog data are provided to the customer via the set-top box STB 408 and/or some other signal processing component. The STB 408 of an embodiment can be configured to be IP-enabled and/or otherwise configured to deliver IP television services to provide live video streaming capability for users to stream video to multiple user devices/systems.

Interactive television services that allow a customer to input data to the architecture 400 likewise are provided by the STB 408. As shown in FIG. 4, the STB 408 of an embodiment is configured as a multipurpose computing device having at least one computer processor, memory, and/or input/output mechanism(s) and functionalities. An input/output mechanism receives input from server-side processes via the HFC network 402 and from customers via input devices such as the remote control device 412, keyboard 414, or other computing device/system 416, such as a tablet/slate computer, smart phone, etc.

The STB 408 of an embodiment can also include IP communication capability and provide a filter interface 418 for presenting filtered programming and/or content via STB 408 to the TV 404. While the filter interface 418 may be implemented using a STB, the filter interface 418 may also be provided using a wireless device 420, any type of network media device, or any device capable of interfacing with a STB 408 or in a server or other module on the head end side. Compatible devices may include DVRs, wireless phones, PCs, laptop computers, tablet/slate computers, media viewing devices, and the like.

The remote control device 422 and the keyboard 414 may communicate with the STB 408 via a suitable communication transport such as the infrared connection 424. The remote control device 422 may include a biometric input module 426. The STB 408 also includes a video processor for processing and providing digital and analog video signaling to the television set 404 via a cable communication transport 428. A multi-channel tuner is provided for processing video and data to and from the STB 408 and the server-side head end system 406. The STB 408 as well as other components can include or couple to a QAM tuner.

The STB 408 also includes an operating system 430 for directing the functions of the STB 408 in conjunction with a variety of client applications 432. Because a variety of different operating systems 430 may be utilized by a variety of different brands and types of set-top boxes, a middleware layer 434 may be provided to allow a given software application to be executed by a variety of different operating systems. According to an embodiment, the middleware layer 434 may include a set of application programming interfaces (APIs) that are exposed to client applications 432 and operating systems 430 that allow the client applications to communicate with the operating systems through common data calls understood via the API set.

A corresponding middleware layer can be included on the server side of the architecture 400 for facilitating communication between the application server and the STB 408. The middleware layer 434 of the application server and middleware layer of the STB 408 may format data passed between the client side and server side according to a markup language such as Extensible Markup Language (XML) for example.

According to one embodiment, the STB 408 passes digital and analog video and data signaling to the television 404 via a one-way communication transport. According to other embodiments, two-way communication transports may be utilized, for example, via high definition multimedia (HDMI) ports. The STB 408 may receive video and data from the server side of the architecture 400 via the HFC network 402 through a video/data downlink and data via a data downlink.

The STB 408 may transmit data from the client side to the server side via the HFC network 402 via one data uplink. The video/data downlink is an in band downlink that allows for digital and analog video and data signaling from the server side of the architecture 400 using the HFC network 402 to the STB 408 for use by the STB 408 and for distribution to the television set 404. An in band signaling space operates at a relative high frequency, e.g., between 54 and 1000 megahertz and an exemplary signaling space is generally divided into 6 megahertz channels in which may be transmitted as a single analog signal or a greater number of digital signals.

The data downlink and the data uplink between the HFC network 402 and the STB 408 may comprise out of band data links. An out of band frequency range is generally at as a lower frequency than in band signaling. For example, the out of band frequency range may be between zero and 54 megahertz. Data flow between the STB 408 and the application server 410 can be passed through out of band data links. Alternatively, an in band data carousel may be positioned in an in band channel into which a data feed may be processed from the application server 410 through the HFC network 402 to the STB 408. Operation of data transport between components of the architecture 400 is well known to those skilled in the art.

With continuing reference to FIG. 4, the head end 406 is positioned on the server side and includes hardware and software systems responsible for originating and managing content for distributing through the HFC network 402 to the client-side for presentation to customers via television 404 or some other client device/system. As described above, a number of services may be provided by the architecture 400, including digital and analog video programming, interactive television services, telephone services, video-on-demand services, targeted advertising, and provision of information content. An asset manager 436 maintains content at the head end 406. The asset manager 436 may also include a decision server for processing rules and other input to determine what content to provide and populate in an EPG view.

The application server 410 can be configured as a computing system operative to assemble and manage data sent to and received from the STB 408 via the HFC network 402. As described above with reference to the STB 408, the application server 410 includes a middleware layer 434 for processing and preparing data from the head end for receipt and use by the STB 408. For example, the application server 410 via the middleware layer 434 may obtain data from third-party services 440 via the Internet 442 for example and transmit to a customer through the HFC network 402 and the STB 408. For example, a weather report from a third-party weather service may be downloaded by the application server via the Internet 442. When the application server 410 receives the downloaded weather report, the middleware layer 434 may be utilized to format the weather report for receipt and use by the STB 408.

According to one embodiment, data obtained and managed by the middleware layer 434 of the application server 410 is formatted using XML and passed to the STB 408 where the XML-formatted data may be utilized by a client application 432 in concert with the middleware layer 434. As should be appreciated by those skilled in the art, a variety of third-party services data, including news data, weather data, sports data and other information content may be obtained by the application server 410 via distributed computing environments such as the Internet 442 for provision to customers via the HFC network 402 and the STB 408.

According to various embodiments, the application server 410 obtains customer support services data, including billing data, information on customer work order status, answers to frequently asked questions, services provider contact information, and the like from data services 444 for provision to the customer via an interactive television or other session. The services provider data services 444 include a number of services operated by the services provider of the architecture 400 which may include data on a given customer.

A billing system 446 may include information such as a customer's name, street address, business identification number, Social Security number, credit history, and information regarding services and products subscribed to by the customer. According to embodiments, the billing system 446 may also include billing data for services and products subscribed to by the customer for bill processing, billing presentment and payment receipt.

A customer information database 448 may include general information about customers such as place of employment, business address, business telephone number, and demographic information such as age, gender, educational level, and the like. The customer information database 448 may also include information on pending work orders for services or products ordered by the customer. The customer information database 448 may also include general customer information such as answers to frequently asked customer questions and contact information for various service provider offices/departments. As should be understood, information may be stored in a variety of disparate databases operated by the cable services provider.

As shown in the example of FIG. 4, a web services system 450 is illustrated between the application server 410 and the data services 444. According to embodiments, web services system 450 serves as a collection point for data requested from each of the disparate data services systems comprising the data services 444. According to various embodiments, when the application server 410 requires customer services data from one or more of the data services 444, the application server 410 passes a data query to the web services system 450. The web services system 450 formulates a data query to each of the available data services systems for obtaining any required data for a requesting customer as identified by a set-top box or other identification associated with a customer.

The web services system 450 serves as an abstraction layer between the various data services systems and the application server 410. That is, the application server 410 is not required to communicate with the disparate data services systems, nor is the application server 410 required to understand the data structures or data types utilized by the disparate data services systems.

The web services system 450 is operative to communicate with each of the disparate data services systems for obtaining necessary customer data. The customer data obtained by the web services system is assembled and is returned to the application server 410 for ultimate processing via the middleware layer 434, as described above. An authentication system 452 may include information such as secure user names, subscriber profiles, subscriber IDs, passwords, and/or other information for accessing network services. As will be understood by those skilled in the art, the disparate systems may be integrated or provided in any combination of separate systems, wherein FIG. 4 only serves as one example.

Figure 5:
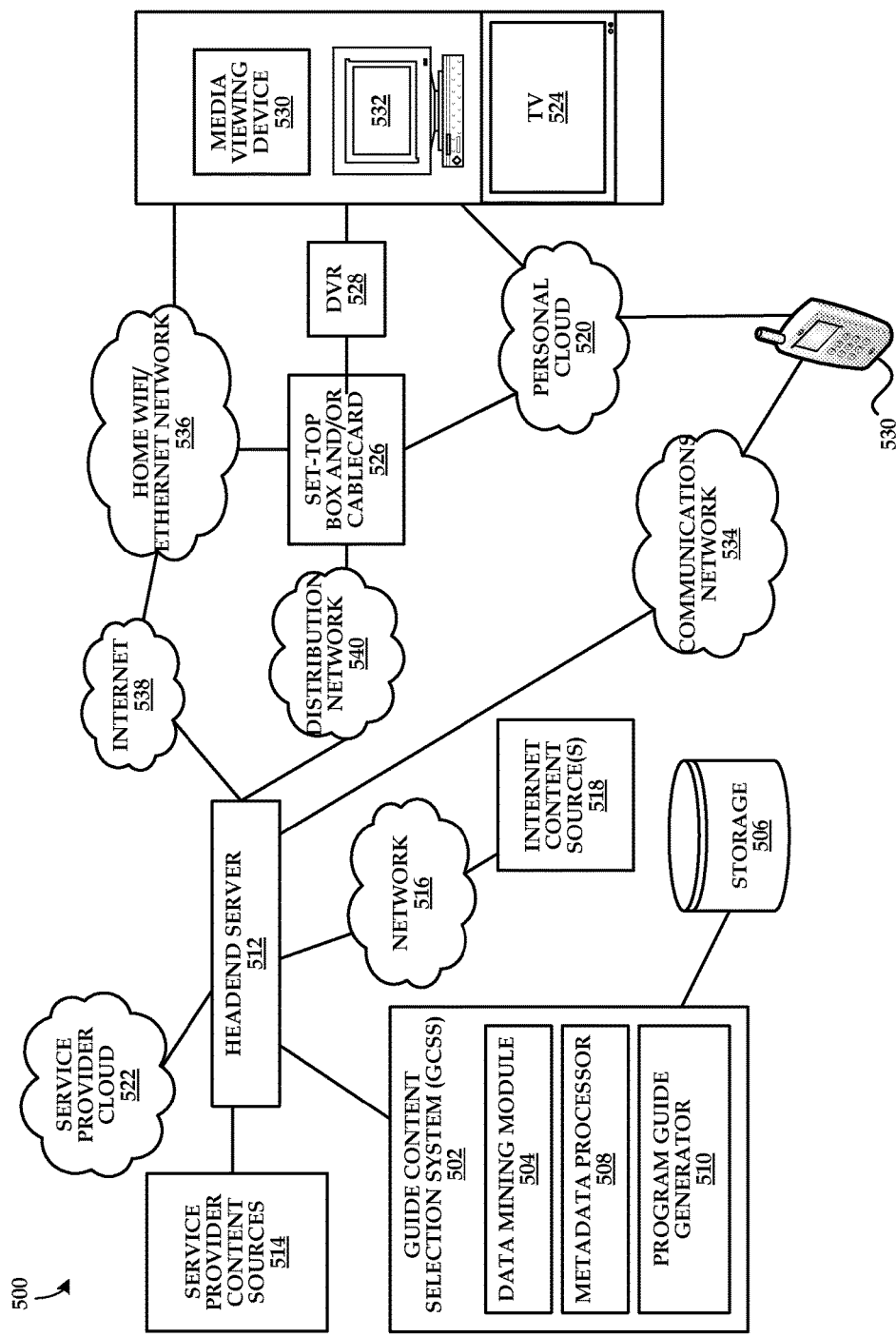
FIG. 5 depicts components of an exemplary communication architecture providing an operating environment according to an embodiment.

FIG. 5 depicts components of an exemplary communication architecture 500 providing an operating environment according to an embodiment. Components of the architecture 500 are configured in part to provide availability information associated with content from a plurality of sources, including QAM in the clear sources, according to an embodiment. A guide content selection system (GCSS) 502 is illustrative of one or more computing components to which metadata and other information for linear and non-linear programs may be provided for analyzing, categorizing, processing, storing, and/or linking with other available data for creating an EPG view.

According to embodiments, each of the components of the GCSS 502 illustrated in FIG. 5 may operate as stand-alone components that are operatively coupled with a data hub for providing and receiving data in association with programming content and availability, business rules, profiles, devices, etc. Accordingly, a data mining module 504, storage 506, metadata processor 508, and a program guide generator 510 may be independent operating entities located at disparate locations and that are operative for generating program guide data for an EPG view and/or operate as a collection or distribution of components at one or more locations in communication via a distributed computing network, such as the Internet or an intranet. In certain embodiments, features of the data mining module 504, storage 506, metadata processor 508, and/or the program guide generator 510 may be integrated or operate in a variety of combinations of components.

As shown in FIG. 5, the headend server 512 may provide different metadata for non-linear programs/content. The guide content selection system (GCSS) 502 may receive metadata for non-linear programs/content from the headend server 512 as well as metadata from other service provider content sources 514, such as Video On Demand (VOD) and video content available through a network 516 from Internet content sources 518.

Additionally, the GCSS 502 may receive customer's purchased content, content available from the customer's cloud 520, and/or content from the service provider's cloud 522. Content metadata may be categorized based on availability and sent to customer devices/systems for maintaining or using the program guide data. The customer devices/systems may include a smart television 524, set-top box and/or cablecard 526, a DVR 528, a smart phone 530, and/or user media devices 530 and 532. Smart phone 530 may receive data via a communications network 534 or by access the customer's personal cloud 520, as known in the art.

The data mining module 504 can be configured to access content sources and retrieve data associated with content for viewing. The data mining module 504 can analyze the data from different perspectives or sources and/or summarize mined data into useful information. The data mining module 504 may categorize the content, for example, based on the day/time/customer preferences, to display the data using an EPG view. The metadata processor 508 can be configured to process linear video program guide data, store past program guide data, process other available data, determine a duration for maintaining the data and/or link other available data for use by the program guide generator 510 to provide the EPG view for display on user devices/systems. The EPG view can be configured to display all available options, including available QAM in the clear channels, to a subscriber based on the processed information, as described above.

The customer site can include a home WiFi/Ethernet network 536 that provide access to the Internet 538, a set-top box and/or cablecard 526, DVR 528, and other user devices/systems. The home WiFi/Ethernet network 536 may receive data and transfer the data to the appropriate endpoint such as the smart television 524, set-top box and/or cablecard 526, DVR 528, and/or other user devices/systems. Likewise, the home WiFi/Ethernet network 536 may receive data from any device/system on the customer site and transmit the data to other components. The set-top box and/or cablecard 526 can receive content using the headend server 512 via the distribution network 540 and provide the content to the user devices/systems for display.

The user may set parameters or otherwise configure an EPG view to display content available for viewing according to genre, selected titles, actors, directors or other criteria. The EPG view can be configured to display on any type of display or screen that a user chooses to view content. For example, the EPG view may be configured to display programs available for viewing on a smart phone, smart television, tablet, or other viewing device/system. Digital rights management may dictate that certain content is available for viewing only on a particular device.

As discussed above, the exemplary architecture 500 includes infrastructure for delivering and receiving content using server-side components and consumer-side or client-side components. The architecture 500 can be configured to deliver high-speed broadband data signals and services to end-users. The architecture 500 includes an IP backbone comprising a packet-switched network, such used for the Internet, wireless communication, ADSL and CATV. The IP backbone can be used to distribute a rich array of digital content, including video streaming, to a variety of client applications.

The architecture 500 enables broad access to content of a content delivery network (CDN) including content accessible by users via the Internet or some other network. IP-enabled set-top boxes can be controlled by a middleware platform to provide linear IP video MPEG by encapsulating packets for transmitting and receiving. Video signals can be delivered using a cable modem termination system (CMTS), quadrature amplitude modulator (QAM) components, and/or some other component or protocol. CDNs typically function by receiving requests from clients, checking a local cache for a copy of the requested resource, or querying some source if a requested resource is not in the cache or has expired for example. CDN servers can be strategically located at the edges of various networks to limit loads on network interconnects and backbones. CDN servers can be redundantly deployed and interact with other CDN servers to respond to content requests from clients in attempts to optimize content delivery. For example, network edge servers can enable ease of browsing, navigating and streaming of content, including streaming live video.

Components can be operatively coupled with a data hub for providing and receiving data in association with programming content and availability, business rules, profiles, devices/systems, etc. Collecting content can include non-linear programs/content, other service provider content (Video On Demand (VOD)), content available through a network that includes a plurality of Internet content sources, and/or QAM in the clear content. Content may be associated with a customer's purchased content, a personal or customer cloud, content from other service provider clouds, and/or from a QAM tuner. Content metadata may be categorized based on the availability and sent to customer devices/systems for maintaining or using the program guide data including EPG views. Depending on the particular customer set-up, a customer may employ different networked components, including a WiFi/Ethernet network to receive video over IP, including but not limited to, a modem, set-top box/cablecard, game console, DVR, smart phone, desktop, laptop, etc.

A typical implementation example may include a subscriber using a tablet, slate phone, smart television and the like to view video programming using a high speed Internet service, a video streaming application, and a DOCSIS modem, eMTA, or gateway. A WiFi/Ethernet network can receive data and transfer data to an appropriate consumer device/system via an IP-enabled STB, and also receive/transmit data from any device/system to other components of the architecture 500. It will be appreciated that there are different types of communication networks and associated components that can be used to deliver video and other content to consumer devices, including smart televisions, tablet computers, laptop computers, desktop computers, etc.

The embodiments and functionalities described herein may operate via a multitude of computer implementations, including wired and wireless computing systems, mobile computing systems (e.g., mobile telephones, tablet or slate type computers, laptop computers, etc.). In addition, the embodiments and functionalities described herein may operate over distributed systems, where application functionality, computer storage including memory, data storage and retrieval and various processing functions may be operated remotely from each other over a distributed computing network, such as the Internet or an intranet. The example devices and systems discussed herein are for purposes of example and illustration and are not limiting of a vast number of configurations that may be utilized for practicing various embodiments.

Figure 6:
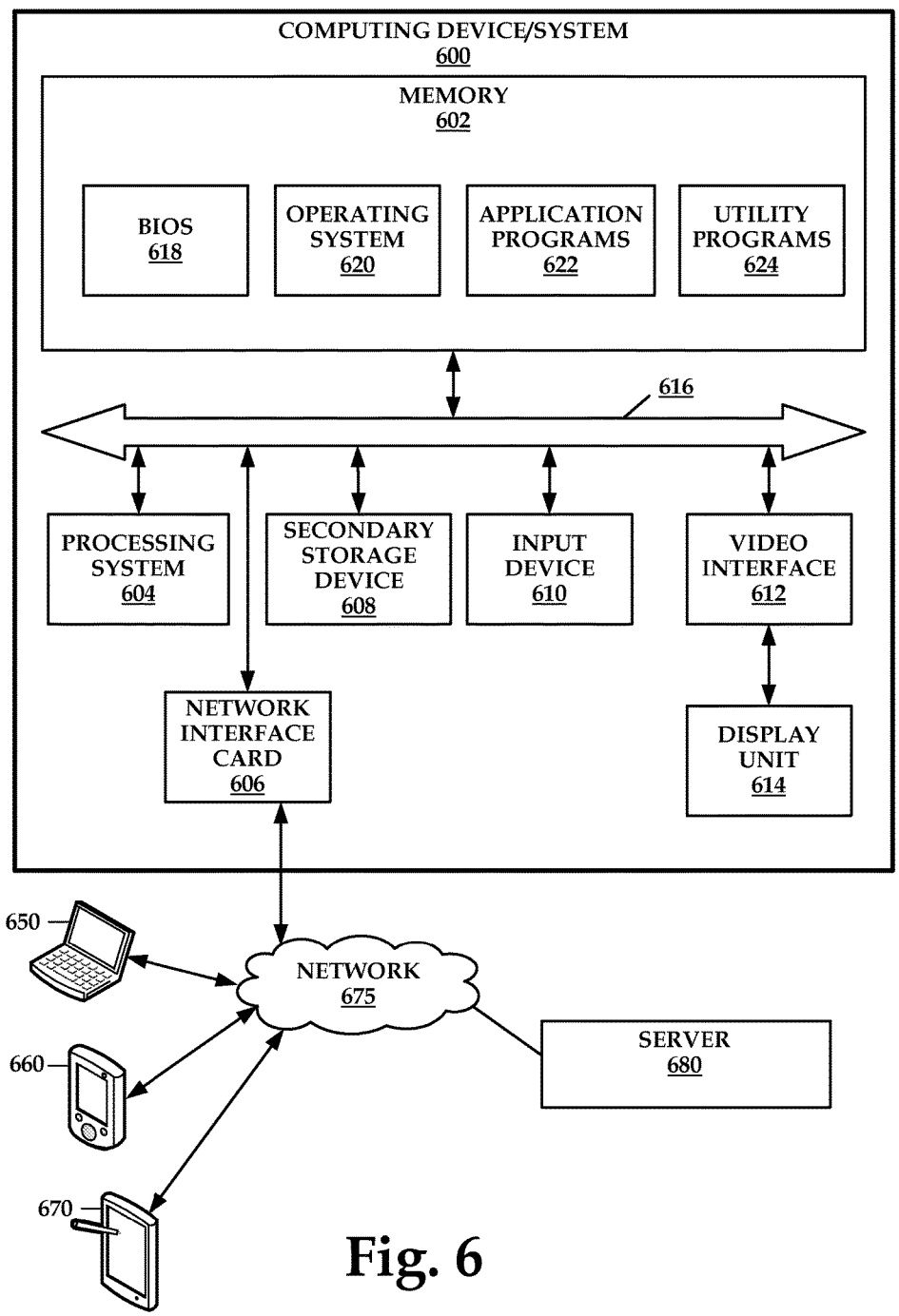
FIG. 6 is a block diagram illustrating exemplary components of a computing device with which embodiments may be practiced.

FIG. 6 is a block diagram illustrating exemplary components with which embodiments may be practiced. It should be appreciated that other embodiments may be implemented using computing devices having hardware and/or software components other than those illustrated in the example of FIG. 6. Computing devices/systems may be implemented in different ways in different embodiments.

For the example of FIG. 6, the computing device 600 includes a processing system 604, computer storage or memory 602, a network interface 606, a secondary storage device 608, an input device 610, a video interface 612, a display unit 614, and a communication medium 616. In other embodiments, the computing device 600 may be implemented using more or fewer hardware components (e.g., a video interface, a display unit, QAM tuner or adapter, input device(s), etc.) or in combination with other types of computer systems and program modules.

The memory 602 includes one or more computer-readable storage, computer storage, or computer-readable storage media capable of storing data and/or computer-executable or encoded instructions. Memory 602 thus may store the computer-executable instructions that, when executed by processor 604, cause the application server 104 to allow broad access to content placed on a content delivery network (CDN).

In various embodiments, the memory 602 is implemented in various ways. For example, the memory 602 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

According to embodiments, the term computer-readable media includes communication media and computer-readable storage media. Communication media include information delivery media. Computer-executable instructions, data structures, program modules, or other data in a modulated data signal, such as a carrier wave or other transport mechanism, may be embodied on a communications medium. The term modulated data signal describes a signal that has one or more characteristics set or changed in such a manner as to encode information in the signal. For example, communication media can include wired media, such as a wired network or direct-wired connection, and wireless media, such as acoustic, radio frequency (RF), infrared, and other wireless media.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 604 includes one or more processing units, which may include tangible integrated circuits that selectively execute computer-executable instructions. In various embodiments, the processing units in the processing system 604 are implemented in various ways. For example, the processing units in the processing system 604 can be implemented as one or more processing cores. In this example, the processing system 604 can comprise one or more core microprocessors. In another example, the processing system 604 can comprise one or more separate microprocessors. In yet another example embodiment, the processing system 604 can comprise Application-Specific Integrated Circuits (ASICs) that provide specific functionality. In yet another example, the processing system 604 provides specific functionality by using an ASIC and by executing computer-executable instructions.

The computing device 600 may be enabled to send data to and receive data from a communication network via a network interface 606. In different embodiments, the network interface 606 is implemented in different ways, such as an Ethernet interface, a token-ring network interface, a fiber optic network interface, a wireless network interface (e.g., Wi-Fi, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 608 includes one or more computer-readable storage media, and may store data and computer-executable instructions not directly accessible by the processing system 604. That is, the processing system 604 performs an I/O operation to retrieve data and/or computer-executable instructions from the secondary storage device 608. In various embodiments, the secondary storage device 608 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 610 enables the computing device 600 to receive input from a user. Example types of input devices include, but are not limited to, keyboards, mice, trackballs, stylus input devices, key pads, microphones, joysticks, touch-sensitive display screens, and other types of devices that provide user input to the computing device 600. The video interface 612 outputs video information to the display unit 614. In different embodiments, the video interface 612 is implemented in different ways. For example, the video interface 612 is a video expansion card. In another example, the video interface 612 is integrated into a motherboard of the computing device 600.

In various embodiments, the display unit 614 can be a an LCD display panel, a touch-sensitive display panel, an LED screen, a projector, a cathode-ray tube display, or another type of display unit. In various embodiments, the video interface 612 communicates with the display unit 614 in various ways. For example, the video interface 612 can communicate with the display unit 614 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 616 facilitates communication among the hardware components of the computing device 600. In different embodiments, the communications medium 616 facilitates communication among different components of the computing device 600. For instance, in the example of FIG. 6, the communications medium 616 facilitates communication among the memory 602, the processing system 604, the network interface 606, the secondary storage device 608, the input device 610, and the video interface 612. In different embodiments, the communications medium 616 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 602 stores various types of data and/or software instructions. For instance, in the example of FIG. 6, the memory 602 stores a Basic Input/Output System (BIOS) 618, and an operating system 620. The BIOS 618 includes a set of software instructions that, when executed by the processing system 604, cause the computing device 600 to boot up. The operating system 620 includes a set of software instructions that, when executed by the processing system 604, cause the computing device 600 to provide an operating system that coordinates the activities and sharing of resources of the computing device 600. The memory 602 also stores one or more application programs 622 that, when executed by the processing system 604, cause the computing device 600 to provide applications to users. The memory 602 also stores one or more utility programs 624 that, when executed by the processing system 604, cause the computing device 600 to provide utilities to other software programs.

Embodiments of the present invention may be utilized in various distributed computing environments where tasks are performed by remote processing devices that are linked through a communications network in a distributed computing environment. Moreover, embodiments may be implemented such that each or many of the components illustrated in FIG. 6 may be integrated onto a single integrated circuit. When operating via such a single integrated circuit, the functionality, described herein, may be operated via application-specific logic integrated with other components of the computing device/system 600 on the single integrated circuit.

A server 680 may provide other services to client devices/systems. As one example, server 680 may be a web server providing web services over the web network 675. Example clients include computing device 650, which may include any general purpose personal computer (such as computing device 600), a tablet computing device 670 and/or mobile computing device 660, such as smart phones.

Figures 7A, 7B:
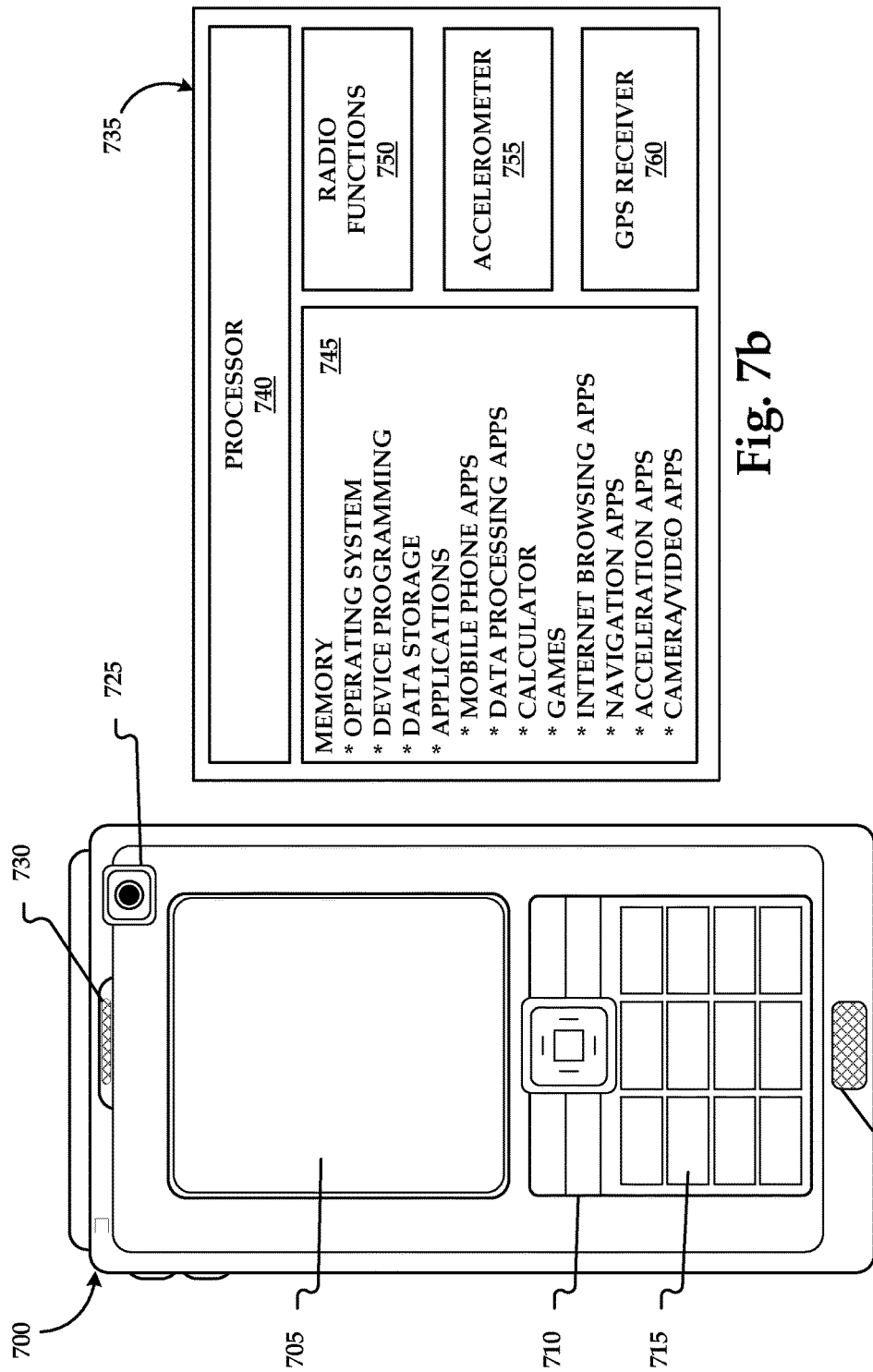
FIGS. 7a-7b illustrate an exemplary mobile computing environment in which embodiments may be practiced.

FIGS. 7a-7b illustrate an exemplary mobile computing environment comprising a mobile computing device 700 such as a smart phone, a tablet or slate computer, a laptop computer, and the like, with which embodiments may be practiced. The mobile computing device 700 is illustrative of any suitable device operative to send, receive and process wireless communications according to embodiments of the present invention. A display screen 705 is operative for displaying a variety of information such as information about incoming and outgoing communications, as well as, a variety of data and displayable objects, for example, text, alphanumeric data, photographs, and the like.

Data input to the device 700 may be performed via a variety of suitable means, such as, touch screen input via the display screen 705, keyboard or keypad input via a data entry area 710, key input via one or more selectable buttons or controls 715, voice input via a microphone 718 disposed on the device 700, photographic input via a camera 725 functionality associated with the mobile computing device, or any other suitable input means. Data may be output via the device 700 via any suitable output means, including but not limited to, display on the display screen 705, audible output via an associated speaker 730 or connected earphone system, vibration module for providing tactile output, and the like.

Referring now to FIG. 7b, operational unit 735 is illustrative of internal operating functionality of the mobile computing device 700. A processor 740 is illustrative of a general purpose computer processor for processing incoming and outgoing data and communications and controlling operation of the device and associated software applications via a mobile computing device operating system. Memory 745 may be utilized for storing a device operating system, device programming, one or more stored applications, for example, mobile telephone applications, data processing applications, calculators, games, Internet browsing applications, navigation applications, acceleration applications, camera and/or video applications, etc.

Mobile computing device 700 may contain an accelerometer 755 for detecting acceleration, and can be used to sense orientation, vibration, and/or shock. Mobile computing device 700 may contain a global positioning system (GPS) system (e.g., GPS send/receive functionality) 760. A GPS system 760 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 750 include all required functionality, including onboard antennae, for allowing the device 700 to communicate with other communication devices and systems via a wireless network. Radio functions 750 may be utilized to communicate with a wireless or WIFI-based positioning system to determine a device location.

Although described herein in combination with mobile computing device 700, in alternative embodiments the invention may be used in combination with any number of computer systems, such as in desktop environments, laptop or notebook computer systems, multiprocessor systems, micro-processor based or programmable consumer electronics, networked PCs, mini computers, main frame computers and the like. Embodiments of the present invention may be utilized in various distributed computing environments where tasks are performed by remote processing devices that are linked through a communications network in a distributed computing environment, and where programs may be located in both local and remote memory storage.

Embodiments, for example, are described above with reference to block diagrams and/or operational illustrations of methods, systems, and computer program products according to embodiments. The functions/acts noted in the blocks may occur out of the order as shown in any flowchart or described herein. For example, two processes shown or described in succession may in fact be executed substantially concurrently or the blocks may sometimes be executed in the reverse order, depending upon the functionality/acts involved.

Although embodiments have been described as being associated with data stored in memory and other storage mediums, data may also be stored on or read from other types of computer storage or computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method comprising:
receiving content over a communication network including IP-based content and quadrature amplitude modulated (QAM) in the clear content;
using a QAM tuner to tune to one or more QAM in the clear channels associated with the QAM in the clear content;
using an electronic program guide (EPG) interface to control the QAM tuner and receive EPG information for display in an EPG view including the content available via the one or more QAM in the clear channels and IP-based content via one or more IP channels, the EPG interface operating to populate the EPG view with availability and signal strength of the one or more QAM in the clear channels in conjunction with corresponding IP channel information and to:
selectively control tuning of the QAM tuner to a high definition television (HDTV) local broadcast affiliate using QAM in the clear channel information and content delivery network (CDN) information;
issue a tuning command to the QAM tuner to tune to a QAM in the clear HDTV channel rather than a corresponding IP channel for a channel of the HDTV local broadcast affiliate including:
directing the QAM tuner to the location of the QAM in the clear HDTV channel for the channel of the HDTV local broadcast affiliate; and
communicating a program identifier (ID) to a headend component in order to provide the channel of the HDTV local broadcast affiliate via the QAM in the clear HDTV channel;
provide an option of selecting the QAM in the clear HDTV channel using the QAM tuner rather than using the corresponding IP channel for the channel of the HDTV local broadcast affiliate; and
displaying the EPG view populated with the content available via the one or more IP channels and the one or more QAM in the clear channels, the displaying of the EPG view further including displaying an integrated control with the EPG view configured to receive input to control which delivery network to use to view a program for a listed channel, wherein the integrated control is further configured to display a high definition (HD) QAM setting to control display of the program for the listed channel using a corresponding HD QAM in the clear signal and display an HD IP setting to control display of the program for the listed channel using a corresponding HD IP signal.

2. The method of claim 1, further comprising automatically tuning to the channel of the HDTV local broadcast affiliate when an RF signal quality exceeds an IP signal quality.

3. The method of claim 1, further comprising using the EPG interface to control the QAM tuner in part to populate aspects of the EPG view including prioritizing QAM in the clear channels over IP channels.

4. The method of claim 3, further comprising providing the EPG interface for download.

5. The method of claim 1, further comprising populating the EPG view with the one or more QAM in the clear channels, and available IP channels, including providing a selectable option to choose a QAM in the clear channel over an IP channel.

6. The method of claim 1, further comprising using the EPG interface to tune to QAM in the clear video services, digital video services, encrypted digital video services, or analog video services.

7. The method of claim 1, further comprising using the EPG view to display advanced digital IP, On Demand, and/or QAM in the clear services.

8. The method of claim 7, further comprising selectively displaying content using QAM tuning information and relevant CDN URL information.

9. The method of claim 1, further comprising storing QAM in the clear channel preferences in computer storage.

10. The method of claim 1, further comprising generating the EPG information based in part on HD QAM in the clear channel availability.

11. The method of claim 1, further comprising bridging an IP video application to direct an HDTV tuner to tune to an HD QAM in the clear channel.

12. An apparatus comprising:
an EPG application coupled to a processor and configured to:
populate an EPG view with content available via one or more IP channels and one or more QAM in the clear channels;
tune to QAM in the clear video services, digital video services, encrypted digital video services, or analog video services including:
selectively control tuning of a QAM tuner to an HDTV local broadcast affiliate using QAM in the clear channel information and content delivery network (CDN) information; and
automatically issue a tuning command to the QAM tuner to tune to a channel of the HDTV local broadcast affiliate via a QAM in the clear HDTV channel rather than a corresponding IP channel when a radio frequency (RF) signal quality exceeds an IP signal quality including:
directing the QAM tuner to the location of the QAM in the clear HDTV channel for the channel of the HDTV local broadcast affiliate; and
communicating a program ID to a headend component in order to provide the channel of the HDTV local broadcast affiliate via the QAM in the clear HDTV channel;
provide an option of selecting the QAM in the clear HDTV channel using the QAM tuner rather than using the corresponding IP channel for the channel of the HDTV local broadcast affiliate;
display an integrated control with the EPG view that is configured to receive input to control which delivery network to use to view a program for a listed channel, wherein the integrated control is further configured to display an HD QAM setting to control display of the program for the listed channel using a corresponding HD QAM in the clear signal and display an HD IP setting to control display of the program for the listed channel using a corresponding HD IP signal; and
store the EPG information in computer storage.

13. The apparatus of claim 12, wherein the EPG application generates EPG information based in part on a service type and QAM reception capability.

14. The apparatus of claim 12, wherein the EPG application is further configured to bridge an IP video application to direct the QAM tuner to tune to QAM in the clear channels and prioritize QAM in the clear channels over IP channels.

15. The apparatus of claim 14, wherein the EPG application operates in conjunction with the QAM tuner to translate local HD frequencies into recognizable local channels for display.

16. The apparatus of claim 12, wherein the EPG application is configured to communicate a QAM channel, carrier, frequency, and appropriate program identifier (PID) information.

17. The apparatus of claim 12, further to populate the EPG view with availability and signal strength of the one or more QAM in the clear channels in conjunction with corresponding IP channel information.

18. A computer storage device including instructions that, when executed, operate to:
receive content over a communication network including IP content and QAM in the clear content;
use a QAM tuner to tune to one or more QAM in the clear channels associated with the QAM in the clear content;
use an EPG interface to receive EPG information for display in an EPG view including information associated with the one or more QAM in the clear channels, unencrypted digital channels, encrypted digital channels, and analog video services, wherein the EPG interface operates to populate the EPG view with availability and signal strength of the one or more QAM in the clear channels in conjunction with corresponding IP channel information and:
selectively control tuning to an HDTV local broadcast affiliate using QAM in the clear channel information and content delivery network (CDN) information;
issue a tuning command to the QAM tuner to tune to a channel of the HDTV local broadcast affiliate via a QAM in the clear HDTV channel rather than a corresponding IP channel for the channel of the HDTV local broadcast affiliate including:
  directing the QAM tuner to the location of the QAM in the clear HDTV channel for the channel of the HDTV local broadcast affiliate; and
  communicating a program ID to a headend component in order to provide the channel of the HDTV local broadcast affiliate via the QAM in the clear HDTV channel; and
provide an option of selecting the QAM in the clear HDTV channel using the QAM tuner rather than using the corresponding IP channel for the channel of the HDTV local broadcast affiliate; and display an integrated control with the EPG view that is configured to receive input to control which delivery network to use to view a program for a listed channel, wherein the integrated control is further configured to display an HD QAM setting to control display of the program for the listed channel using a corresponding HD QAM in the clear signal and display an HD IP setting to control display of the program for the listed channel using a corresponding HD IP signal.

19. The computer storage device of claim 18, wherein the instructions are further configured to provide the EPG information based in part on a device or system type.

20. The computer storage device of claim 18, wherein the instructions are further configured to control operation of the QAM tuner to navigate to QAM in the clear signals.

\* \* \* \* \*